PINCH ROLLER MECHANISM FOR HANDLING PLURAL TYPES
OF ENDLESS TYPE TAPE CARTRIDGES

Filed June 27, 1966

INVENTOR.
REX C. WILSON
BY Fulwider, Patton, Rieber, Lee, and Utecht
ATTORNEYS

United States Patent Office 3,337,105
Patented Aug. 22, 1967

3,337,105

PINCH ROLLER MECHANISM FOR HANDLING PLURAL TYPES OF ENDLESS TYPE TAPE CARTRIDGES

Rex C. Wilson, Granada Hills, Calif., assignor to Muntz Stereo-Pak, Inc., Van Nuys, Calif., a corporation of California Filed June 27, 1966, Ser. No. 560,577
12 Claims. (Cl. 226—90)

The present invention relates to improvements in tape recorder and playback machines and, more particularly, to a novel pinch roller mechanism for machines capable of handling endless-type magnetic tape cartridges.

Endless-type magnetic tape cartridges are of two basic forms. Both forms include a flat hollow case for a reel carrying a roll of tape, together with means for guiding tape from an inside of the reel along a rear wall of the case and means for returning tape to the outside of the reel. The rear wall of the case includes a plurality of openings for receiving a tape-driving capstan and a record or playback head of the associated tape-handling machine.

One form of endless-type tape cartridge further includes an idler roller opposite the opening for receiving the capstan and adapted to press a length of tape into driving engagement with the capstan when the cartridge is held in a rearward position on the associated tape-handling machine with the capstan and head extending through the associated rear wall openings in the case.

The other form of the endless-type tape cartridge includes a bottom hole in the case immediately forward of the opening in the rear wall of the case adapted to receive the capstan. The second form of cartridge does not include an idler roller.

Different types of tape-handling machines are provided for the different forms of endless-type tape cartridges and the machine for handling one form of cartridge is not capable of handling cartridges of the other form.

More particularly, the tape machine for recording on or playing back information from tape in the first form of tape cartridge, that is, the cartridge having the built-in idler roller, includes a generally horizontal top deck, and a record or playback head and tape-driving capstan extending vertically above the deck and spaced horizontally from each other. The head and tape-driving capstan are adapted to fit into the rear wall openings in the case and the idler roller to press a length of tape into driving engagement with the capstan when the case is held in the rearward position. To hold the case in the rearward position, the machine further comprises selectively operable means including a finger for engaging one side of the cartridge case to force the cartridge toward the rearward position. A support member extends from the top of the deck on an opposite side of the cartridge to hold the cartridge in place against the transverse forces exerted on the cartridge by the finger.

The foregoing form of machine is incapable of handling the second form of cartridge, that is, the cartridge with the bottom hole, since no means are included for bringing a length of tape in the second form of cartridge into driving engagement with the capstan. Also, the foregoing form of machine has great difficulty in holding different size cartridges of the first form in the rearward position since the side support member for opposing transverse forces is adapted to engage only one size cartridge.

The tape-handling machine for recording on or playing back information from tape in the second form of cartridge, that is, the cartridge including the bottom hole, comprises the horizontal deck, record or playback head and tape-driving capstan arrangement of the first form of machine. In addition, the machine includes a pinch roller of resilient material connected to a horizontal rocker shaft below the deck. Selectively operable means are also included for turning the rocker shaft to swing the pinch roller through an opening in the deck and the bottom hole in the cartridge case between a lowered position below the deck and a raised position above the deck. In the raised position, the pinch roller brings a length of tape into tight, driving engagement with the capstan when the cartridge is in the rearward position.

Although the machine for handling the second form of tape is extremely simple and reliable in its operation, tightly holds a length of tape in driving engagement with the capstan, and is capable of handling different size cartridges, it is not capable of holding the first form of cartridge in the rearward position.

From the foregoing, it is appreciated that owners of one type of machine are compelled to purchase only one type of tape cartridge while owners of the other type of machine are compelled to purchase cartridges of the other type. This can be very annoying, particularly when certain selections are only offered in one or the other forms of tape cartridges or when one form of tape cartridge is plentiful and the other form is difficult to obtain.

Accordingly, it is a general object of the present invention to provide simple and inexpensive means enabling a recorder or playback machine for handling the second form of cartridge, that is, the cartridge with the bottom hole, to also handle the first form of endless-type tape cartridge, that is, the cartridge with the idler roller.

A more specific object of the present invention is to provide means enabling a recorder or playback machine to handle either form of endless-type tape cartridges including means for releasably holding either form of cartridge in the rearward position without developing transverse forces thereon and thus allowing the machine to reliably handle different size cartridges.

The foregoing as well as other objects and advantages of the present invention may be more clearly understood by reference to the following detailed description when considered with the drawing which, by way of example only, illustrates one form of pinch roller mechanism for endless-type tape cartridge players embodying the features of the present invention.

Figures 1, 3A, 4:
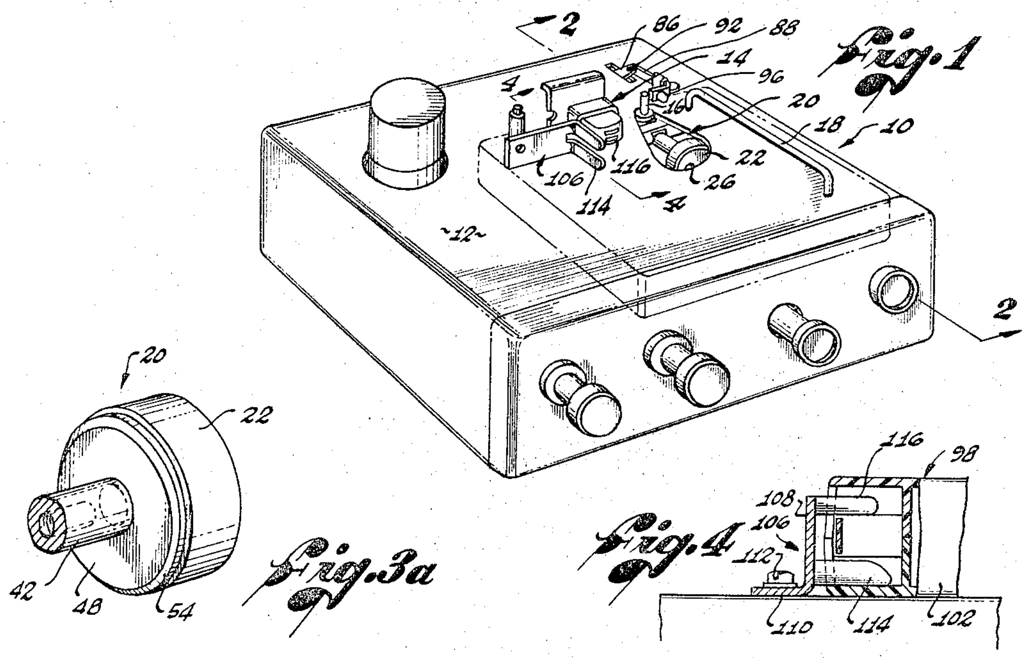
FIGURE 1 is a perspective view of a tape player including the pinch roller mechanism of the present invention.
FIGURE 3A is a perspective view of a portion of the pinch roller mechanism.
FIGURE 4 is a fragmentary sectional side view taken along the line 4—4 in FIGURE 1 illustrating means for holding the cartridge on the top deck of the tape player.

In the drawing, the tape player is represented by the numeral 10 and, generally speaking, is of the previously described construction adapted to handle the second form of endless-type tape cartridge including a bottom hole. In this regard, the tape player 10 includes a generally flat, horizontal top deck 12, and a record or playback head 14 and a capstan 16 extending vertically above the deck and spaced horizontally from each other. The tape player also includes a rod 18 extending above and along the deck 12 to guide a cartridge over the deck to a rearward position with the head 14 and capstan 16 extending slightly through openings in a rear wall of the cartridge and against the tape contained therein. In addition to the foregoing, the tape player 10 includes a pinch roller mechanism 20 which, in accordance with the present invention, is adapted to press a length of tape in the second form of cartridge into driving engagement with the capstan 16 and to hold the first form of cartridge in the rearward position with a length of tape pinched between an idler roller and the capstan.

More particularly, the pinch roller mechanism 20 includes a pinch roller 22 and an actuating device 24 for raising and lowering the pinch roller through a top hole 26 in the deck. The pinch roller 22 consists of a flat cylinder of resilient material around a cylindrical metal bushing 28 while the actuating device includes a rocker shaft 30, a slide arm 32, a lever arm 34, a return spring 36, a catch device 38, and a trigger unit 40.

Figure 2:
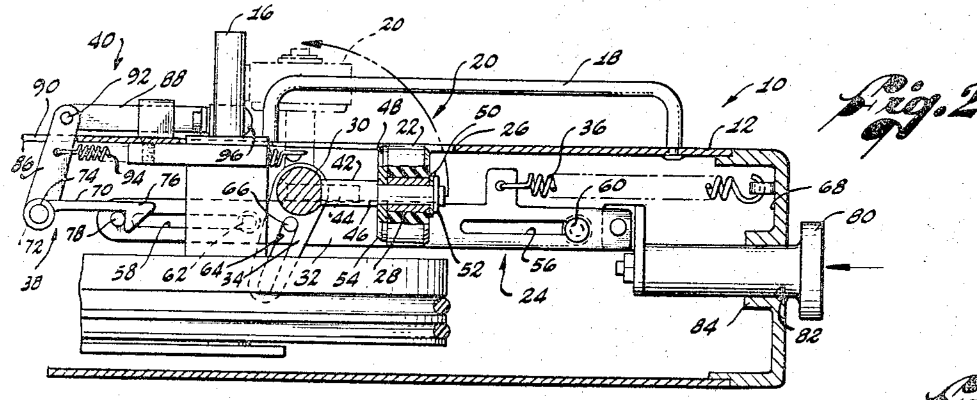
FIGURE 2 is a cross sectional side view taken along the line 2—2 of FIGURE 1, illustrating the pinch roller mechanism in a lowered position, and in a raised position in phantom outline.

The rocker shaft 30 is mounted in a horizontal plane below the top deck 12 and is adapted to turn freely about its longitudinal axis to swing the pinch roller 22 from a lowered position below the deck (see FIGURE 2), through the hole 26, to a raised position above the deck to press tightly against the capstan 16 (see phantom outline in FIGURE 2).

In this regard, the pinch roller 22 is carried on one end of a rod 42 which, in turn, is screwed onto a threaded pin 44 connected to and extending radially from the rocker shaft 30. The end of the rod 42 receiving the pinch roller 22 is of reduced diameter to define an annular shoulder 46. A metal retaining washer 48 extends around the rod 42 and bears against the shoulder 46. The pinch roller 22 is held tightly against the washer 46 by a retaining disc 50 and a split snap ring 52 around the rod 42 on an opposite side of the pinch roller.

The diameter of the retaining washer 48 is less than the diameter of the pinch roller 22, such that an annular peripheral portion of the pinch roller extends radially beyond the washer to press against the capstan 16 when in the raised position. This insures that tape in the second form of cartridge (including the bottom hole) will not be damaged by the washer 48 when the pinch roller presses the tape into tight driving engagement with the capstan 16 (see FIGURE 2).

Figure 3:
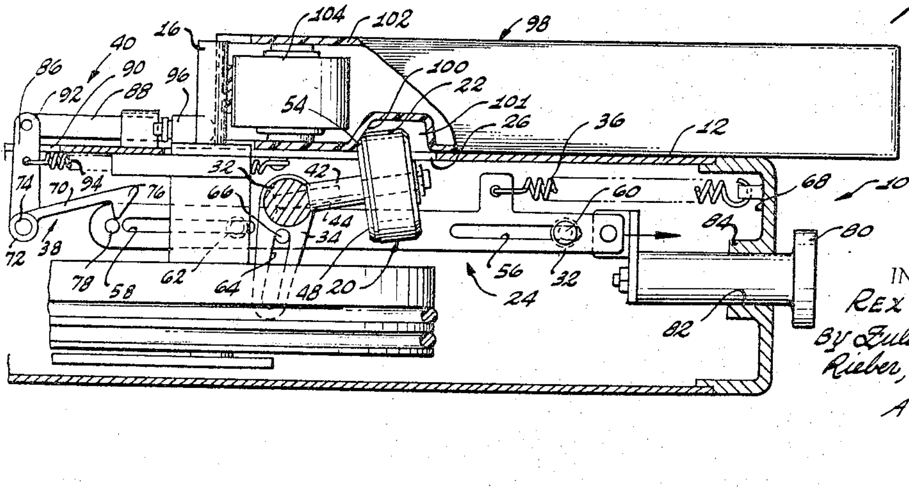
FIGURE 3 is a side view similar to FIGURE 2 showing the pinch roller mechanism in a slightly raised position to hold the first form of cartridge in the reaward position with a length of recording tape in driving engagement with the capstan.

As will be discussed in greater detail hereinafter and is illustrated in FIGURE 3, the washer 48 includes a beveled lower edge portion 54. The edge portion 54 is adapted to engage the bottom of the first form of cartridge to hold the cartridge in its rearward position as the pinch roller 22 swings from its lowered position to its raised position. This allows the pinch roller mechanism 20 to hold the cartridge in the rearward position without deforming or otherwise wearing the pinch roller 22.

The balance of the actuating device 24, including the slide arm 32, lever arm 34, return spring 36, catch device 38, and trigger unit 40, is adapted to swing the pinch roller 22 between the lowered and raised positions and to swing the pinch roller from its lowered position upward to hold the first form of cartridge in its rearward position. In this regard, the slide arm 32 includes front and rear elongated slots 56 and 58 for receiving pin members 60 and 62 extending from a right side of the tape player. The pins 60 and 62 guide the arm in a fore—aft direction between a forward and a rearward position.

The lever arm 34 is connected to a left end portion of the rocker shaft 30 and includes an elongated slot 64 for receiving a horizontal pin 66 connected to the slide arm 32. Thus arranged, when the slide arm 32 is in the rearward position illustrated in FIGURE 2, the pinch roller 22 is in its lowered position below the top of the deck 12. As the slide arm 32 moves to its forward position, the pin 66 in the slot 64 turns the rocker shaft 30 to swing the pinch roller to the raised position tightly against the capstan 16 as illustrated in phantom outline in FIGURE 2.

In the actuating device 24, the return spring 36 is connected to the slide arm 32 and to the front panel 68 of the tape player 10 to continuously urge the slide arm toward the forward position to swing the pinch roller 22 to its raised position tightly against the capstan 16. In the raised position, as well as in all arcuate positions between the lowered and raised positions, the return spring 36 continuously urges the pinch roller 22 toward the capstan 16. Therefore, the return spring 36 presses the pinch roller 22 tightly against the capstan 16 to bring a length of tape in the second form of cartridge into driving engagement with the capstan whereby a turning of the capstan drives the tape past the record or playback head 14.

In the actuating mechanism 24, the catch device 38 is adapted to releasably hold the slide arm 32 in its rearward position with the pinch roller 22 in its lowered position below the top deck 12. In this regard, the catch device includes a latch arm 70 secured at one end to a sleeve 72 extending around a horizontal pin 74 connected to the right side of the tape player, and a hooked end portion 76 for fitting over a horizontal pin 78 connected to the rear end portion of the slide arm 32. The catch device 38 thus releasably holds the slide arm 32 in the rearward position with the return spring 36 extended ready to rapidly move the pinch roller 22 to its raised position upon a release of the catch device.

To move the slide arm to the rearward position, a push-button knob 80 is connected to the forward end of the slide arm 32 and extends through a hole 82 in the front panel of the tape player. The hole 82 is surrounded by a collar 84 which aids in supporting the push-button knob 80 for forward and rearward movement to manually slide the arm 32 to the rearward position where the catch device 38 engages the pin 78 to releasably hold the slide arm in the rearward position.

To release the catch device 38 and to thereby allow the slide arm 32 to automatically return to its forward position and rapidly swing the pinch roller 22 to its raised position, the trigger device 40 is connected to the catch device and extends above the top deck 12 to contact the tape cartridge as it moves to its rearward position adjacent the capstan 16 and head 14. In this regard, the trigger device 40 includes a vertically extending connecting arm 86 and a horizontally extending trigger arm 88. The lower end of the connecting arm 86 is secured to the sleeve 72 to turn therewith while an upper end of the connecting arm extends through a slot 90 in the top deck 12 and is connected by a pivot pin 92 to a rear end portion of the trigger arm 88. A coil spring 94 is secured at one end to the connecting arm 86 and to the underside of the top deck 12 to continuously urge the trigger arm 88 to a forward position with a tip 96 of the trigger arm slightly forward of the capstan 16. In this position, the latch arm 70 is pivoted to a downward position to engage and releasably hold the horizontal pin 72 when the slide arm 32 is in its rearward position.

The positioning of the tip 96 of the trigger arm 88 forward of the capstan 16 allows the tip to engage the rear wall of the case of a tape cartridge as the cartridge is moved rearwardly over the top deck. This is clearly illustrated in FIGURE 3 wherein the cartridge, represented generally by numeral 98 and being of the first form, engages the tip 96 to force the trigger arm 88 rearwardly and release the catch device 38 allowing the slide arm 32 to move toward its forward position under the force of the return spring 36. As this occurs, the pinch roller 22 swings rapidly upward through the hole 26 in the deck 12 and in the illustrated form of the cartridge 98 engages a vertically extending shoulder 100 in a cavity 101 in the bottom of the cartridge case 102.

In the present invention, the shoulder 100 lies directly forward of the axis of the built-in idler roller 104. The shoulder also is spaced a predetermined distance forward of the rocker shaft 30 when the cartridge 98 is in its rearward position with the capstan 16 and head 14 extending through rear wall openings in case 102. The predetermined distance is such that the beveled edge 54 of the washer 48 engages the shoulder as the pinch roller 22 swings toward its raised position (see FIGURES 3). In this position, the return spring 36 forces the pinch roller mechanism 20 against shoulder 100 to hold the cartridge 98 firmly in the rearward position with a length of tape pinched tightly between the capstan 16 and the idler roller 104 whereby a turning of the idler roller drives the tape past the head 14. Also, in the position illustrated in FIGURE 3, the pinch roller mechanism 20 does not exert lateral transverse forces on the cartridge 98. Therefore, separate side support means need not be employed, and the machine may handle cartridges of different sizes.

In engaging the vertically extending shoulder 100, the illustrated form of the pinch roller mechanism 20, however, does exert an upward force on the cartridge 98. Therefore, to maintain the cartridge 98 flat on the top deck 12, a retainer member, represented generally by the numeral 106, is secured to the top deck adjacent the head 14 (see FIGURES 1 and 4). The retainer member 106 is generally L-shaped and includes a vertical leg 108 and a horizontal foot 110. The foot 110 is secured to the top of the deck by screws 112 while the leg 108 carries a pair of vertically spaced, forwardly extending, horizontal fingers 114 and 116. The fingers are adapted to pass through the rear wall opening receiving the head 14 with the lower finger 114 extending along and engaging the top surface of the bottom of the case 102 to hold the cartridge 98 on top of the deck 12.

Accordingly, the retainer 106 combines with the pinch roller mechanism 20 to tightly hold the cartridge 98 in its rearward position thereby allowing the tape player 10 to record on or play back information from the tape in the cartridge.

When it is desired to remove the cartridge 98 from the tape player 10, the push-button knob 80 is pressed inwardly to cause the catch device 38 to engage the pin 72 and hold the slide arm 32 in its rearward position with the pinch roller 22 below the top deck 12. The cartridge 98 then may be slipped forward along the top deck and removed from the tape player.

When it is desired to again play the cartridge or a different cartridge of the same or different form or size, the cartridge is simply guided rearward along the top deck 12 until the forward wall engages the tip 96. The rearward movement of the cartridge in contact with the tip 96 actuates the trigger unit 40 to bring the pinch roller mechanism 20 upwardly through the top deck 12 either to contact and bring tape into driving engagement with the capstan 16 or to engage the vertically extending shoulder and hold the cartridge in its rearward position with tape pinched between an idler roller and the capstan.

From the foregoing, it is appreciated that the present invention provides a simple and inexpensive means enabling a recording or playback machine to handle both forms of endless-type tape cartridges without exerting undesired lateral forces on the cartridges.

While a particular form of pinch roller mechanism has been described in some detail herein, changes and modifications may be made in the illustrated form without departing from the spirit of the invention. It is therefore intended that the present invention be limited in scope only by the terms of the following claims.

I claim:

1. In a magnetic tape-handling machine including a horizontal top deck and a record or playback head and a tape driving capstan extending vertically above said deck and horizontally spaced from each other, a mechanism enabling said machine to handle different forms of endless-type tape cartridges, said cartridges including a flat hollow case for a reel carrying a roll of tape, means for guiding tape from an inside of said reel along a rear wall of said case having openings for receiving said capstan and head, and means for returning tape to an outside of said reel, a first form of said cartridges including an idler roller opposite said opening for receiving said capstan and adapted to press a length of said tape into driving engagement with said capstan when said case is held in a rearward position on said deck with said capstan and head extending through said openings, and a second form of said cartridges including a bottom hole in its case adjacent and forward of said opening for receiving said capstan, said mechanism comprising:

pinch roller means including an annular peripheral portion of resilient material;

and selectively operable means for moving said pinch roller means through a hole in said top deck between a lowered position below said deck and a raised position above said deck and against said capstan such that the pinch roller passes through the bottom hole in said second form of cartridge to bring a length of tape into driving engagement with said capstan when said case is in said rearward position, and for moving said pinch roller means from said lowered position toward said raised position through said hole in said deck such that a lower marginal edge of said pinch roller means engages a vertically extending shoulder on a bottom of said case of said first form of cartridge forward of said idler roller to hold said case in said rearward position with a length of said tape in driving engagement with said capstan.

2. The mechanism of claim 1 wherein said selectively operable means includes a horizontal rocker shaft mounted below said top deck of said machine, means connecting said pinch roller means to said rocker shaft for swinging through said hole in said deck between said lowered and raised positions with a turning of said rocker shaft and selectively operable means for turning said rocker shaft to swing said pinch roller means between said lowered and raised position.

3. The mechanism of claim 2 wherein said selectively operable means further includes spring means continuously urging said rocker shaft to swing said pinch roller means to said raised position tightly against said capstan.

4. The mechanism of claim 1 including a metal disc on the lower surface of said pinch roller means and having a radial dimension slightly less than said pinch roller means such that an annular peripheral portion of said pinch roller means extends radially beyond the outer edge of said metal disc and wherein said selectively operable means moves an outer portion of said disc into engagement with said vertically extending shoulder on the bottom of the case for said first form of cartridge to hold said cartridge in said rearward position.

5. The mechanism of claim 4 wherein said metal disc includes a beveled, lower, outer edge for engaging said vertically extending shoulder.

6. The mechanism of claim 3 wherein said selectively operable means for turning said rocker shaft includes an arm mounted for forward and rearward movement under said top deck between first and second positions and means connecting said arm to said rocker shaft such that said pinch roller is in said lowered position when said arm is in said first position and said pinch roller is in said raised position when said arm is in said second position.

7. The mechanism of claim 6 including spring means connected to said arm for continuously urging said arm toward said second position.

8. The mechanism of claim 7 including catch means for releasably holding said arm in said first position and trigger means connected to said catch means and extending above said top deck adjacent said capstan to engage the case of said cartridge in said rearward position to release said catch means.

9. In a machine for recording or playing back information from a tape in an endless-type tape cartridge including a flat hollow case for a reel carrying a roll of tape, means for guiding tape from an inside of said reel along a rear wall of said case having openings for receiving a capstan and a record or playback head of said machine, means for returning tape to an outside of said reel, and a bottom hole immediately forward of said hole for receiving said capstan, said machine including a horizontal top deck, a record or playback head and a tape-driving capstan extending vertically above said deck and spaced horizontally from each other, a pinch roller connected to a horizontal rocker shaft below said deck, and means for turning said rocker shaft to swing said pinch roller through an opening in said deck and said bottom hole in said case between a lowered position below said deck and a raised position above said deck to press a length of tape into driving engagement with said capstan when said case is in a rearward position with said capstan and head extending through said rear wall openings in said case, means adapting said machine to handle an endless-type tape cartridge including an idler roller stationed in its case opposite a rear wall opening for receiving said capstan, said idler roller being adapted to press a length of tape into driving engagement with said capstan when said case is held in a rearward position on said deck, said means comprising:

- said horizontal rocker shaft mounted below said top deck;
- said pinch roller connected to said rocker shaft;
- said means for turning said rocker shaft to swing said pinch roller through said opening in said deck between said lowered and raised positions;
- a vertically extending shoulder on a bottom of said case directly forward of said idler roller and spaced a predetermined distance from said rocker shaft when said case is in said rearward position such that a bottom edge portion of said pinch roller engages and presses forward on said shoulder as said pinch roller swings upward from said lowered position toward said raised position;
- and spring means connected to said rocker shaft for urging said pinch roller towards said raised position against said case to hold said case in said rearward position.

10. The means of claim 9 wherein said pinch roller presses upward as well as forward on said shoulder and said means includes a support structure on said deck for engaging said case in said rearward position and holding said case down on top of said deck.

11. The means of claim 9 including a metal disc on the bottom of said pinch roller and having a radial dimension smaller than the radius of said pinch roller such that an outer annular portion of the resilient material comprising said pinch roller extends outwardly beyond said metal disc and said disc alone engages said shoulder as said pinch roller swings upwardly from said lowered position toward said raised position.

12. The means of claim 9 wherein said spring means is connected to said means for turning said rocker shaft comprising:

- an arm movable between first and second positions;
- means connected to said arm for turning said rocker shaft to swing said pinch roller between said lowered and raised positions as said arm moves between said first and second positions;
- a spring connected to said arm for continuously urging said arm toward said second position;
- catch means for holding said arm in said first position;
- and trigger means extending from said catch means above said deck to engage said case when in said rearward position to release said catch means and thereby allow said pinch roller to swing toward said raised position under influence of said spring.

References Cited

UNITED STATES PATENTS 3,023,943 3/1962 Schober -------- 242—55.13 X
3,096,920 7/1963 Schober ------------ 226—181
3,269,625 8/1966 Nieland et al. -------- 226—90

M. HENSON WOOD, Jr., *Primary Examiner.*

ALLEN N. KNOWLES, *Examiner.*